United States Patent
Yonezawa et al.

(10) Patent No.: US 12,299,955 B2
(45) Date of Patent: *May 13, 2025

(54) IMAGE PROCESSING APPARATUS, IMAGE PROCESSING METHOD, AND PROGRAM

(71) Applicant: NEC Corporation, Tokyo (JP)

(72) Inventors: Yaeko Yonezawa, Tokyo (JP); Kaito Horita, Tokyo (JP); Takaaki Iwabuchi, Tokyo (JP); Akiko Kubo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/220,038

(22) Filed: Jul. 10, 2023

(65) Prior Publication Data

US 2023/0351726 A1 Nov. 2, 2023

Related U.S. Application Data

(63) Continuation of application No. 17/641,045, filed as application No. PCT/JP2020/034551 on Sep. 11, 2020.

(30) Foreign Application Priority Data

Sep. 17, 2019 (JP) ................. 2019-167973

(51) Int. Cl.
*G06V 10/75* (2022.01)
*G06Q 10/087* (2023.01)
(Continued)

(52) U.S. Cl.
CPC ......... *G06V 10/751* (2022.01); *G06Q 10/087* (2013.01); *G06T 7/60* (2013.01); *G06T 7/73* (2017.01); *G06V 10/255* (2022.01)

(58) Field of Classification Search
CPC .... G06V 10/751; G06V 10/255; G06V 20/52; G06V 20/63; G06Q 10/087; G06Q 30/06; G06T 7/60; G06T 7/73
(Continued)

(56) References Cited

U.S. PATENT DOCUMENTS

| 4,843,631 A | 6/1989 | Steinpichler et al. |
| 6,711,293 B1 | 3/2004 | Lowe |

(Continued)

FOREIGN PATENT DOCUMENTS

| JP | 2011-253344 A | 12/2011 |
| JP | 2014-029586 A | 2/2014 |

(Continued)

OTHER PUBLICATIONS

JP Office Action for JP Application No. 2021-546649, mailed on Jul. 2, 2024 with English Translation.
(Continued)

*Primary Examiner* — Negussie Worku

(57) ABSTRACT

By processing an image in which a plurality of articles (such as products) placed on a shelf are captured, an image processing unit (120) determines the article name (such as the product name) of each of the plurality of articles captured in the image. Determining an article name also includes determining identification information tied to the article name. When a specific condition is satisfied for an article the article name of which is indeterminable by the image processing unit (120) (hereinafter described as an undetermined article), an article inference unit (130) infers the article name of the undetermined article to be the article name of an article positioned adjacent to the undetermined article.

10 Claims, 11 Drawing Sheets

(51) Int. Cl.
*G06T 7/60* (2017.01)
*G06T 7/73* (2017.01)
*G06V 10/20* (2022.01)

(58) Field of Classification Search
USPC .......................................................... 382/103
See application file for complete search history.

(56) References Cited

U.S. PATENT DOCUMENTS

| | | |
|---|---|---|
| 8,126,198 B2 | 2/2012 | Batt |
| 8,340,816 B2 | 12/2012 | Funada et al. |
| 9,505,554 B1* | 11/2016 | Kong ................... G06V 10/25 |
| 10,956,856 B2* | 3/2021 | Ma ....................... G06Q 10/087 |
| 11,087,272 B2* | 8/2021 | Skaff ..................... G06N 20/00 |
| 12,141,777 B2 | 11/2024 | Nakamura et al. |
| 2008/0234862 A1 | 9/2008 | Funada et al. |
| 2010/0135522 A1 | 6/2010 | Batt |
| 2011/0035045 A1* | 2/2011 | Walter ................ F02M 63/0036 |
| | | 700/214 |
| 2012/0067746 A1* | 3/2012 | Gremaud ................ G07D 9/002 |
| | | 206/0.81 |
| 2015/0003729 A1 | 1/2015 | Hayashi |
| 2015/0262116 A1 | 9/2015 | Katircioglu et al. |
| 2015/0379366 A1 | 12/2015 | Nomura et al. |
| 2016/0217417 A1* | 7/2016 | Ma ......................... H04N 23/00 |
| 2017/0193430 A1* | 7/2017 | Barreira Avegliano ...................... |
| | | G06V 20/52 |
| 2017/0278056 A1 | 9/2017 | Itou et al. |
| 2017/0286901 A1 | 10/2017 | Skaff et al. |
| 2017/0308764 A1 | 10/2017 | Higa |
| 2018/0120106 A1* | 5/2018 | Sato ........................ G01C 21/20 |
| 2019/0087663 A1 | 3/2019 | Yamazaki et al. |
| 2019/0197561 A1 | 6/2019 | Adato et al. |
| 2019/0392244 A1 | 12/2019 | Nomura et al. |
| 2020/0311659 A1 | 10/2020 | Yonezawa et al. |
| 2020/0394634 A1* | 12/2020 | Iwabuchi ............. G06Q 20/203 |
| 2021/0056568 A1 | 2/2021 | Chen et al. |
| 2022/0335707 A1* | 10/2022 | Yonezawa ............ G06Q 10/087 |
| 2022/0388777 A1* | 12/2022 | Saito ..................... B65G 1/1375 |
| 2023/0214769 A1* | 7/2023 | Han ....................... G06V 10/44 |
| | | 705/28 |
| 2023/0237687 A1* | 7/2023 | Yonezawa ................. G06T 7/11 |
| | | 382/103 |
| 2023/0351726 A1 | 11/2023 | Yonezawa et al. |

FOREIGN PATENT DOCUMENTS

| | | |
|---|---|---|
| JP | 2014-029686 A | 2/2014 |
| WO | 2016/063484 A1 | 4/2016 |
| WO | 2019/064925 A1 | 4/2019 |

OTHER PUBLICATIONS

International Search Report for PCT Application No. PCT/JP2020/034551, mailed on Dec. 8, 2020.
US Office Action for U.S. Appl. No. 17/641,045, mailed on Apr. 24, 2024.
US Office Action for U.S. Appl. No. 18/219,498, mailed on Aug. 16, 2024.
US Notice of Allowance for U.S. Appl. No. 17/641,045 mailed on Sep. 18, 2024.
US Notice of Allowance for U.S. Appl. No. 18/219,498, mailed on Jan. 14, 2025.

* cited by examiner

FIG. 2

STORE A 142

| DATE AND TIME | IMAGE | POSITION | ARTICLE NAME | INFERENCE BY ARTICLE INFERENCE UNIT |
|---|---|---|---|---|
| .... | .... | .... | BEER α | |
| | | .... | BEER α | ○ |
| | | .... | BEER α | |
| | | .... | BEER β | |
| | | .... | — | .... |

IMAGE PROCESSING APPARATUS, IMAGE PROCESSING METHOD, AND PROGRAM

CROSS-REFERENCE TO RELATED APPLICATIONS

This application is a continuation application of U.S. patent application Ser. No. 17/641,045 filed on Mar. 7, 2022, which is a National Stage Entry of PCT/JP2020/034551 filed on Sep. 11, 2020, which claims priority from Japanese Patent Application 2019-167973 filed on Sep. 17, 2019, the contents of all of which are incorporated herein by reference, in their entirety.

TECHNICAL FIELD

The present invention relates to an image processing apparatus, an image processing method, and a program.

BACKGROUND ART

Arrangement of articles in a store affects sales of the articles. Therefore, arrangement of articles is often preplanned. In this case, a person in charge of articles confirms that the articles are arranged as planned.

As a technology for assisting the confirmation work, Patent Document 1 describes recognition of a displayed article by processing a captured image of the displayed article. Patent Document 1 further describes, when an unrecognized article exists, determining an already recognized article existing around the unrecognized article as a candidate of the unrecognized article.

RELATED DOCUMENT

Patent Document

Patent Document 1: International Application Publication No. WO 2016/063484, Specification

DISCLOSURE OF THE INVENTION

Technical Problem

The present inventor examined inferring, when an article unrecognized by image processing exists, the article name of the article with high precision. An object of the present invention is to infer, when an article unrecognized by image processing exists, the article name of the article with high precision.

Solution to Problem

The present invention provides an image processing apparatus including:
- an image processing unit that determines, by processing an image in which a plurality of articles placed on a shelf are captured, an article name of each of the plurality of articles captured in the image; and
- an article inference unit that infers, when a specific condition is satisfied for an undetermined article which is the article an article name of which is indeterminable by the image processing unit, an article name of the undetermined article to be an article name of the article positioned adjacent to the undetermined article.

The present invention provides an image processing method including, by a computer:
- by processing an image in which a plurality of articles placed on a shelf are captured, determining an article name of each of the plurality of articles captured in the image; and,
- when a specific condition is satisfied for an undetermined article which is the article an article name of which is indeterminable, inferring an article name of the undetermined article to be an article name of the article positioned adjacent to the undetermined article.

The present invention provides a program causing a computer to perform:
- a function of, by processing an image in which a plurality of articles placed on a shelf are captured, determining an article name of each of the plurality of articles captured in the image; and
- a function of, when a specific condition is satisfied for an undetermined article which is the article an article name of which is indeterminable, inferring an article name of the undetermined article to be an article name of the article positioned adjacent to the undetermined article.

Advantageous Effects of Invention

The present invention enables, when an article unrecognized by image processing exists, inference of the article name of the article with high precision.

BRIEF DESCRIPTION OF THE DRAWINGS

FIG. 2 is a diagram illustrating an example of a data structure in a result storage unit.

DESCRIPTION OF EMBODIMENTS

An example embodiment of the present invention is described below by using drawings. Note that, in each drawing, similar components are given similar signs, and description thereof is not repeated as appropriate.

Figure 1:
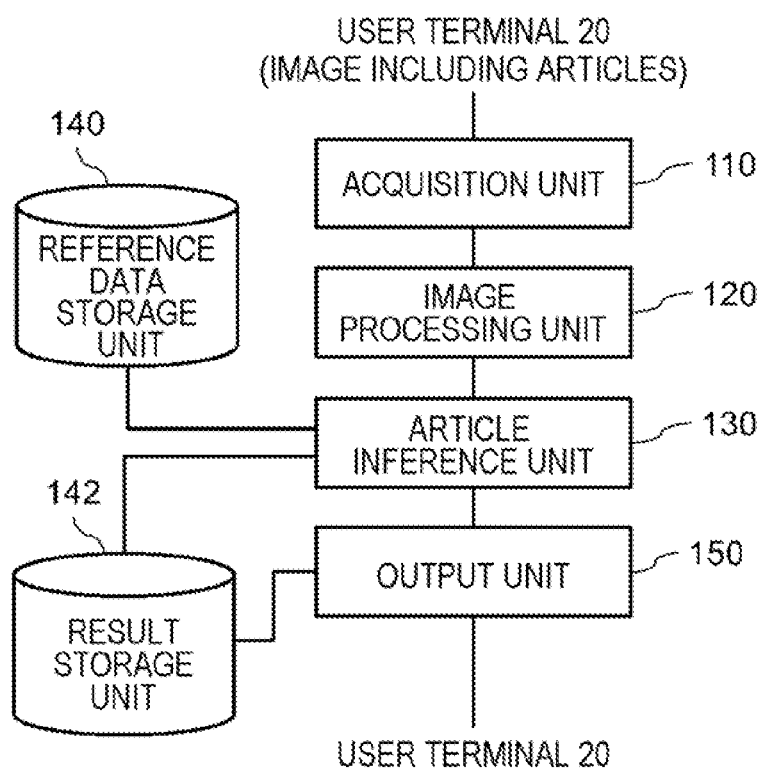
FIG. 1 is a diagram illustrating an example of a functional configuration of an image processing apparatus according to an example embodiment.

FIG. 1 is a diagram illustrating an example of a functional configuration of an image processing apparatus 10 according to an example embodiment. The image processing apparatus 10 includes an image processing unit 120 and an article inference unit 130. By processing an image in which a plurality of articles (such as products) placed on a shelf are captured, the image processing unit 120 determines the article name (such as the product name) of each of the plurality of articles captured in the image. Determining an article name also includes determining identification information tied to the article name. When a specific condition is satisfied for an article the article name of which is indeterminable by the image processing unit 120 (hereinafter described as an undetermined article), the article inference unit 130 infers the article name of the undetermined article to be the article name of an article positioned adjacent to the undetermined article. The image processing apparatus 10 is described in detail below.

In addition to the aforementioned image processing unit 120 and article inference unit 130, the image processing apparatus 10 includes an acquisition unit 110, a reference data storage unit 140, a result storage unit 142, and an output unit 150.

The acquisition unit 110 acquires, from a user terminal 20, an image to be processed by the image processing unit 120, that is, an image including a plurality of articles. For example, the user terminal 20 is a portable terminal carried by a user of the image processing apparatus 10 and has an image capture function. The user generates an image by capturing an image of a shelf in a store. The image includes a plurality of articles placed on the shelf. The user terminal 20 transmits the generated image to the image processing apparatus 10. Note that, along with the image, the user terminal 20 transmits information for determining the store in which the shelf being a subject for the image is installed (hereinafter described as store determination information) and a condition at the time of image generation (hereinafter described as a generation condition). The generation condition at least includes the generation date and time of the image. The acquisition unit 110 also receives the store determination information and the generation condition.

By processing an image transmitted by the user terminal 20, the image processing unit 120 determines the article name of an article included in the image. For example, the image processing unit 120 determines the article name of each of a plurality of articles included in an image by determining an area of each of the plurality of articles and performing feature value matching on each of the plurality of determined areas. The reference data storage unit 140 stores a feature value for each article and a feature value for determining an area of the article. Then, the image processing unit 120 causes the result storage unit 142 to store information including the determination result.

Note that the image processing unit 120 may determine the article name of an article by using a result of machine learning. In this case, the result of machine learning is stored in the reference data storage unit 140.

Further, when an article is inferred to exist but the article name of the article is indeterminable (for example, when an article name a score of which equal to or greater than a reference value does not exist), the image processing unit 120 outputs information indicating an area of the article, that is, an undetermined article, and the article name and the position of an article positioned around the undetermined article to the article inference unit 130.

As described above, the article inference unit 130 infers the article name of an undetermined article to be the article name of an article positioned adjacent to the undetermined article when a specific condition is satisfied. Specific examples of the specific condition are described later. The article inference unit 130 causes the result storage unit 142 to store the inference result.

The output unit 150 outputs an inference result by the article inference unit 130 to the user terminal 20. When receiving information indicating that the inference result by the article inference unit 130 is correct from the user terminal 20, the output unit 150 may cause the result storage unit 142 to store the inference result by the article inference unit 130, that is, the article name of an undetermined article. In this case, the article inference unit 130 may not cause the result storage unit 142 to store the inference result.

Further, the output unit 150 reads information stored by the result storage unit 142 and outputs the information to the user terminal 20 as needed. Note that the output unit 150 may output data stored in the result storage unit 142 to a terminal other than the user terminal 20.

FIG. 2 is a diagram illustrating an example of a data structure in the result storage unit 142. The result storage unit 142 stores, along with an image acquired by the acquisition unit 110 and a generation condition (such as a date and time) of the image, the position of an article included in the image and the article name of the article. Further, when the article name of an article is inferred by the article inference unit 130, the result storage unit 142 also stores information indicating the inference in association with the article.

Note that, when the article name of an undetermined article cannot be inferred by the article inference unit 130 either, the result storage unit 142 stores the position of the undetermined article but does not store the article name of the undetermined article.

Figure 3:
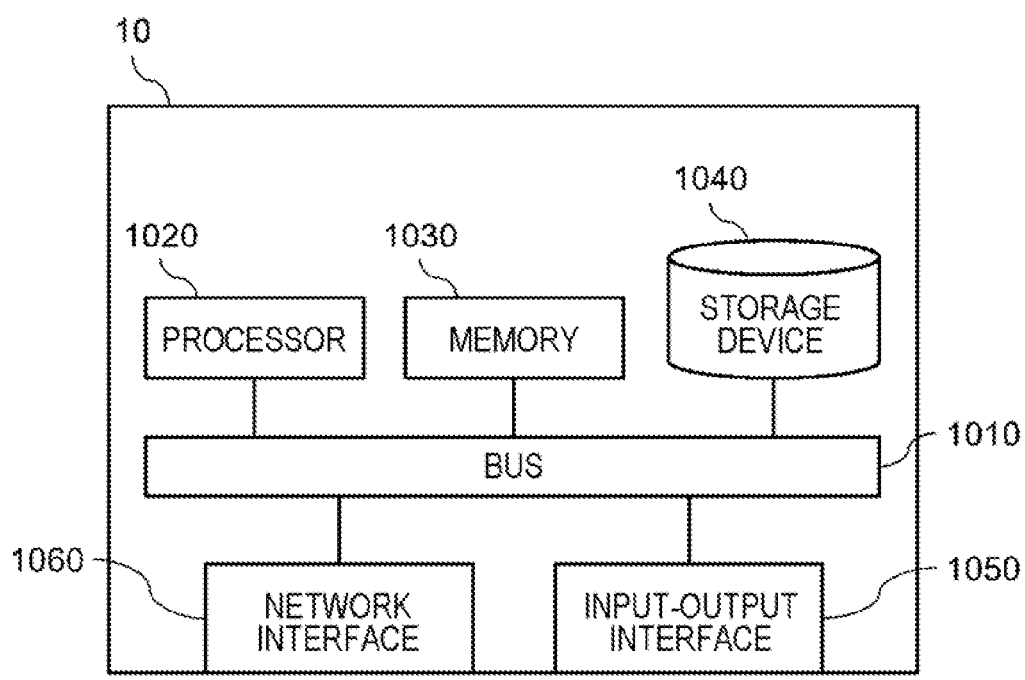
FIG. 3 is a block diagram illustrating a hardware configuration of the image processing apparatus.

FIG. 3 is a block diagram illustrating a hardware configuration of the image processing apparatus 10. The image processing apparatus 10 includes a bus 1010, a processor 1020, a memory 1030, a storage device 1040, an input-output interface 1050, and a network interface 1060.

The bus 1010 is a data transmission channel for the processor 1020, the memory 1030, the storage device 1040, the input-output interface 1050, and the network interface 1060 to transmit and receive data to and from each other. Note that the method for interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules providing the functions of the image processing apparatus (such as the acquisition unit 110, the image processing unit 120, the article inference unit 130, and the output unit 150). By reading each program module into the memory 1030 and executing the program module by the processor 1020, each function related to the program module is provided. Further, the storage device 1040 also functions as various storage units (such as the reference data storage unit 140 and the result storage unit 142).

The input-output interface 1050 is an interface for connecting the image processing apparatus 10 to various types of input-output equipment.

The network interface 1060 is an interface for connecting the image processing apparatus 10 to another apparatus on a network (such as the user terminal 20).

Figure 4:
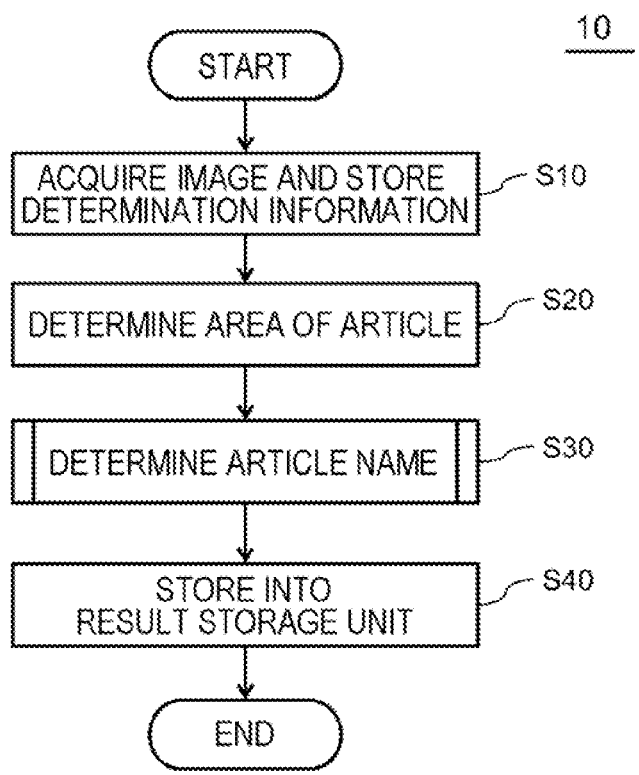
FIG. 4 is a flowchart illustrating an example of processing performed by the image processing apparatus.

FIG. 4 is a flowchart illustrating an example of processing performed by the image processing apparatus 10.

First, a user of the user terminal 20 captures an image of a shelf in a store (such as a store where the user works or a store supervised by the user) and transmits an image generated by the image capture to the image processing apparatus 10 along with store determination information of the store and a generation condition (such as the generation date and time) of the image. The processing may be performed every time an image is generated. Further, the user of the user terminal 20 may capture images of locations different from each other in the shelf and collectively transmit a plurality of images generated by the image capture to the image processing apparatus 10.

When the user terminal 20 transmits the image and the store determination information, the acquisition unit 110 in the image processing apparatus 10 acquires the image, the generation condition of the image, and the store determination information (Step S10). Then, the image processing unit 120 in the image processing apparatus 10 determines an area of an article by processing the image acquired by the acquisition unit 110 (Step S20). When a plurality of articles are included in the image, the image processing unit 120 determines an area of each of the plurality of articles. Next, the image processing unit 120 and the article inference unit 130 determine the article name of the article by processing the determined area of the article (Step S30). Next, the image processing unit 120 and the article inference unit 130 cause the result storage unit 142 to store the article name determined in Step S30 (Step S40).

Note that, when areas of a plurality of shelf tags are determined in Step S20, the processing of Step S30 is performed on each of the areas of the plurality of shelf tags. Further, the processing of Step S20 may be performed by using a result of machine learning.

Figure 5:
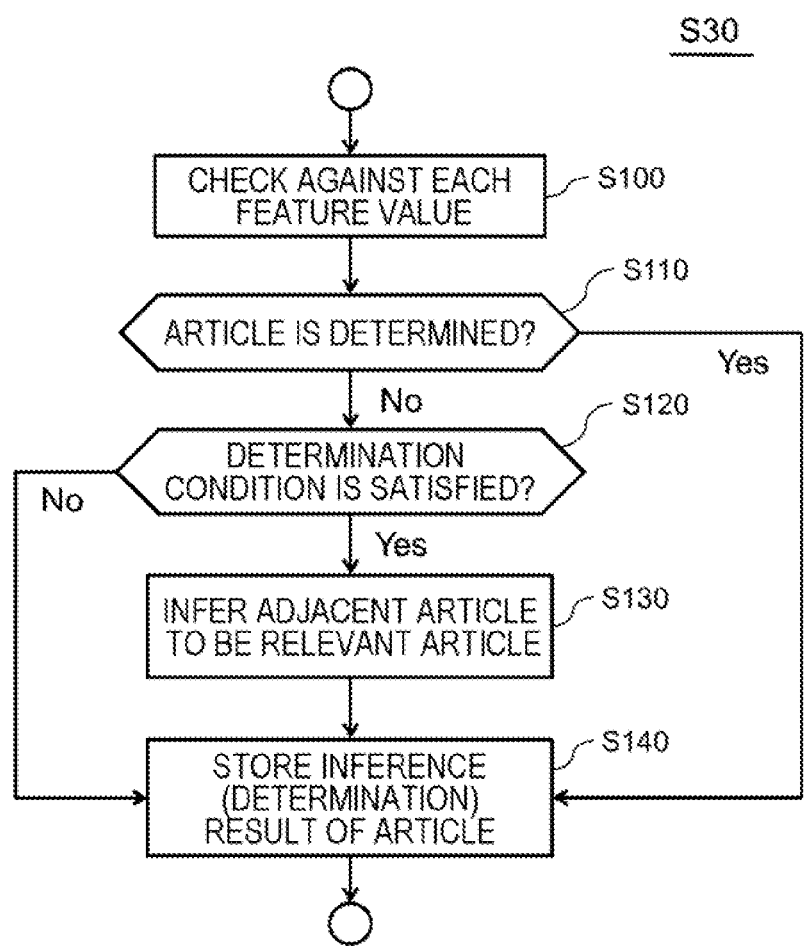
FIG. 5 is a flowchart illustrating a first example of Step S30 in FIG. 4.

FIG. 5 is a flowchart illustrating a first example of Step S30 in FIG. 4. The image processing unit 120 checks the area of the article determined in Step S20 against a feature value stored by the result storage unit 142 and computes a score for each article name (Step S100). Note that the processing of Step S100 may be performed by using a result of machine learning. Then, the image processing unit 120 determines, as the article name of the article positioned in the area, an article name related to a feature value a score of which is equal to or greater than a reference value and is maximum (Step S110: Yes) and causes the result storage unit 142 to store the determined article name in association with information for determining the area, and the image being the processing target (Step S140).

When a feature value a score of which is equal to or greater than the reference value does not exist (Step S110: No), the article inference unit 130 determines whether the area satisfies a specific condition (Step S120). Specific examples of the specific condition are described later by using FIG. 6 to FIG. 9.

When the area satisfies the specific condition (Step S120: Yes), the article inference unit 130 infers the article name of an article in the area (an undetermined article) to be the article name of an article positioned adjacent to the undetermined article (Step S130). Then, the article inference unit 130 causes the result storage unit 142 to store the inference article name in association with information for determining the area and the image being the processing target (Step S140). At this time, the article inference unit 130 also causes the result storage unit 142 to store information indicating that the article name is inferred by the article inference unit 130.

Note that, when the area does not satisfy the specific condition (Step S120: No), the article inference unit 130 causes the result storage unit 142 to store information for determining the area in association with the image being the processing target (Step S140). In this case, the article name field is practically a blank field.

Figure 6:
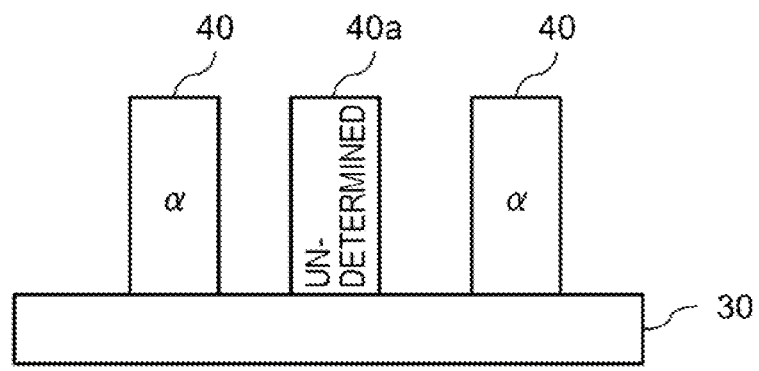
FIG. 6 is a diagram illustrating a first example of a specific condition in Step S120.

FIG. 6 is a diagram illustrating a first example of the specific condition in Step S120. In the example illustrated in the diagram, a plurality of articles 40 are placed on the same shelf 30. In the example, the specific condition is a case that article names of articles 40 on both sides of an undetermined article 40a are identical.

Figure 7:
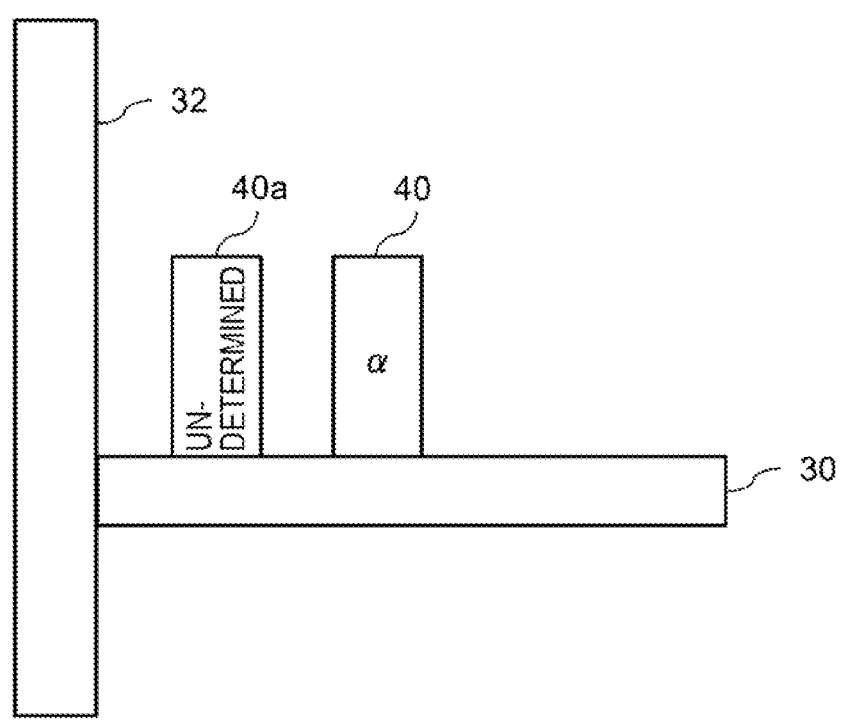
FIG. 7 is a diagram illustrating a second example of the specific condition in Step S120.

FIG. 7 is a diagram illustrating a second example of the specific condition in Step S120. In the example illustrated in the diagram, the specific condition is that an undetermined article 40a is positioned at an end of a shelf 30. In other words, the specific condition is that the distance between the undetermined article 40a and a side 32 of the product shelf is equal to or less than a reference value and another article does not exist between the side 32 and the undetermined article 40a. The reason for determining the example illustrated in the diagram to be a specific condition is that blown-out highlights may occur in an area corresponding to the undetermined article 40a in the image due to reflection of light of a light source in the store by the side 32 or embedded illumination on the side 32.

Figure 8:
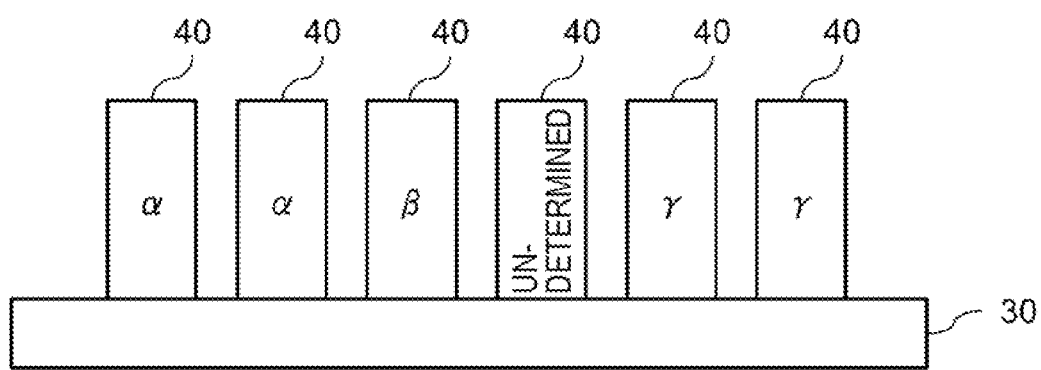
FIG. 8 is a diagram illustrating a third example of the specific condition in Step S120.

FIG. 8 is a diagram illustrating a third example of the specific condition in Step S120. In the example illustrated in the diagram, the specific condition is a case that arrangement of article names of a plurality of articles 40 has regularity and an undetermined article 40a is inferred to have an article name identical to that of an adjacent article 40 in the regularity.

Figure 9:
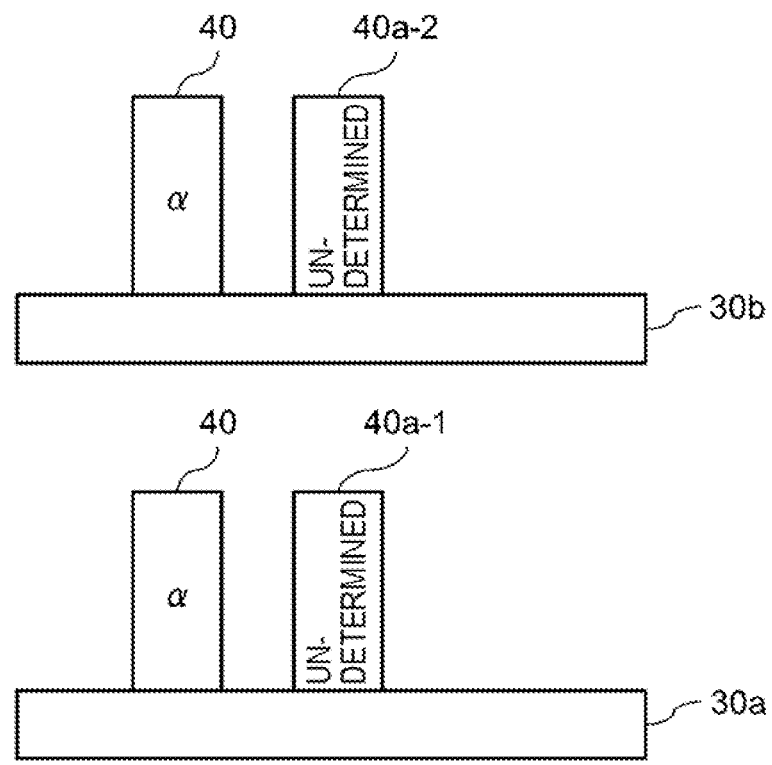
FIG. 9 is a diagram illustrating a fourth example of the specific condition in Step S120.

FIG. 9 is a diagram illustrating a fourth example of the specific condition in Step S120. In the example illustrated in the diagram, the image includes a first shelf 30a and a shelf immediately above the first shelf 30a (hereinafter described as a second shelf 30b). In the example, the specific condition is that the difference in position in a lateral direction between a first undetermined article 40a-1 placed on the first shelf 30a and a second undetermined article 40a-2 placed on the second shelf is equal to or less than a reference value, in other words, the first undetermined article 40a-1 and the second undetermined article 40a-2 are placed at almost the same position in the lateral direction. As an example, the specific condition is a case that both of the undetermined articles 40a-1 and 40a-2 are positioned at ends of the shelves 30a and 30b, respectively. Then, the reason for determining the example illustrated in the diagram to be a specific condition is similar to that for the example illustrated in FIG. 7.

Figure 10:
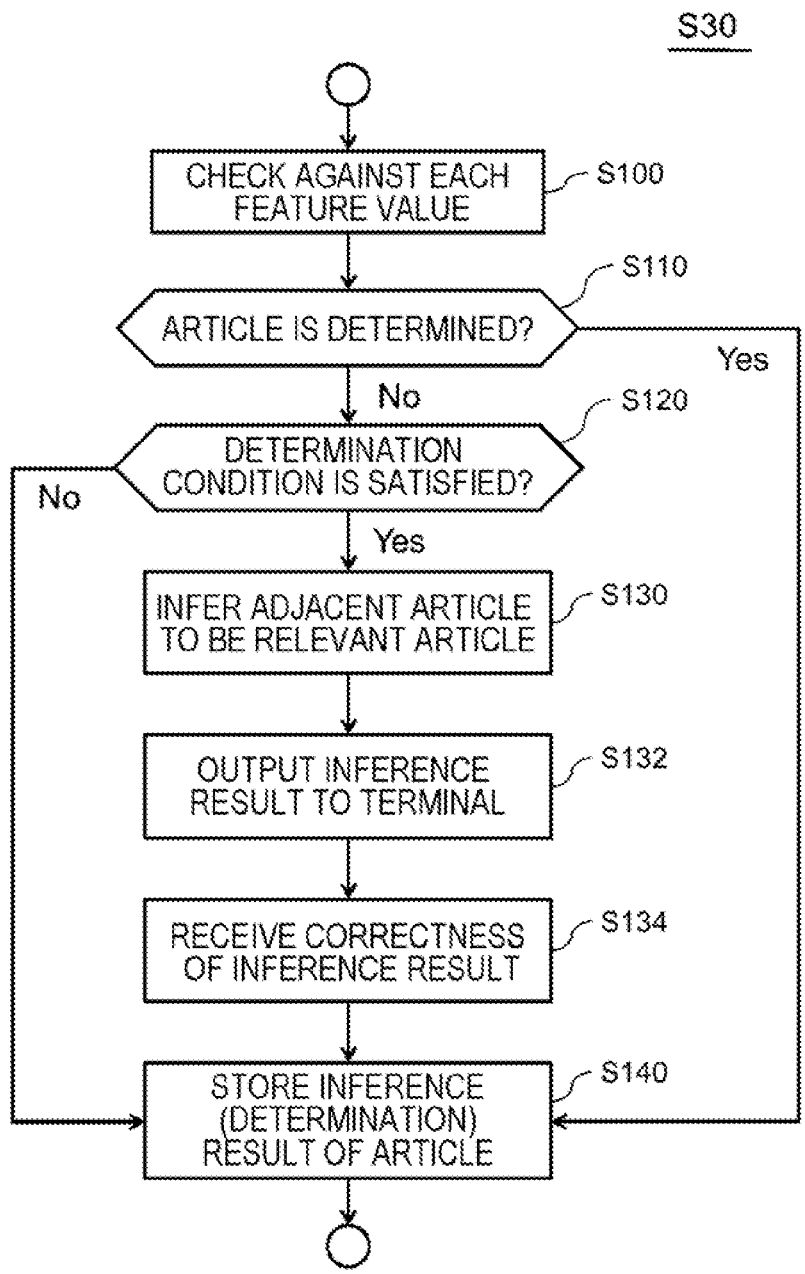
FIG. 10 is a flowchart illustrating a second example of Step S30 in FIG. 4.

FIG. 10 is a flowchart illustrating a second example of Step S30 in FIG. 4. In the example illustrated in the diagram, processing in Step S100 to Step S130 and processing described in Step S140 are similar to those in the first example illustrated in FIG. 5.

When the article inference unit 130 infers the article name of an undetermined article to be the article name of an article positioned adjacent to the undetermined article (Step S130), the output unit 150 outputs the article name inferred by the article inference unit 130 to the user terminal 20 along with an image of the undetermined article (Step S132). Note that it is preferable that the article inference unit 130 do not cause the result storage unit 142 to store the inference result of the article name of the undetermined article 40a.

The user terminal 20 displays the article name received from the output unit 150 (that is, the article name inferred by the article inference unit 130) along with the image of the undetermined article. When confirming correctness of the article name, a user of the user terminal 20 performs input indicating the correctness to the user terminal 20. Then, the user terminal 20 transmits information indicating the correctness of the article name to the image processing apparatus 10.

When receiving the information indicating the correctness of the inference result by the article inference unit 130 from the user terminal 20 (Step S134), the output unit 150 causes the result storage unit 142 to store the inference result by the article inference unit 130, that is, the article name of the undetermined article (Step S140).

Note that, when the article name received from the output unit 150 (that is, the article name inferred by the article inference unit 130) is incorrect, it is preferable that the user of the user terminal 20 input a correct article name and transmit the name to the image processing apparatus 10. In this case, the output unit 150 may cause the result storage unit 142 to store the correct article name transmitted from the user terminal 20.

Figure 11:
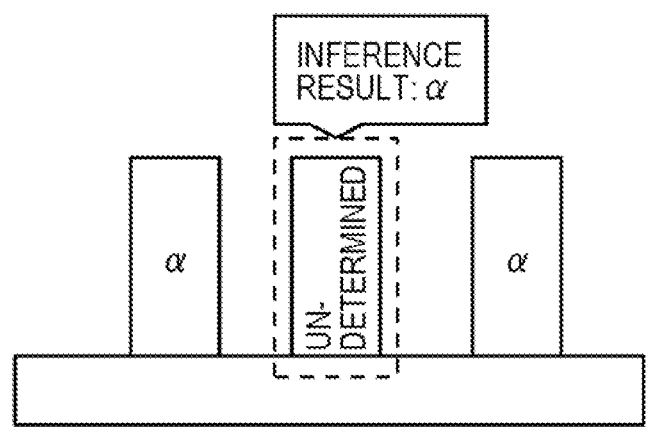
FIG. 11 is a diagram illustrating an example of a screen displayed on a user terminal after Step S132 in FIG. 10.

FIG. 11 is a diagram illustrating an example of a screen displayed on the user terminal 20 after Step S132 in FIG. 10. In the example illustrated in the diagram, the user terminal 20 displays an entire image processed by the image processing unit 120 or an image acquired by cutting out an area including an undetermined article 40*a* in the image. The image includes information allowing determination of the undetermined article 40*a* (such as a frame line enclosing the undetermined article 40*a*). Furthermore, the user terminal 20 also displays the inferred article name for the undetermined article 40*a*. Thus, the user of the user terminal 20 can confirm the image of the undetermined article 40*a* and the inference result of the article name of the undetermined article 40*a* in association with each other.

As described above, the image processing unit 120 in the image processing apparatus 10 according to the present example embodiment determines the article name of an article on a shelf by image processing. Then, when a specific condition is satisfied in a case that an undetermined article 40*a* indeterminable by the image processing unit 120 exists, the article inference unit 130 infers the article name of the undetermined article 40*a* to be the article name of an article 40 positioned adjacent to the undetermined article 40*a*. Thus, when an article unrecognized by image processing exists, the article name of the article can be inferred with high precision.

While the example embodiments of the present invention have been described above with reference to the drawings, the drawings are exemplifications of the present invention, and various configurations other than those described above may be employed.

Further, while a plurality of processes (processing) are described in a sequential order in each of a plurality of flowcharts used in the aforementioned description, an execution order of processes executed in each example embodiment is not limited to the described order. An order of the illustrated processes may be modified without affecting the contents in each example embodiment. Further, the aforementioned example embodiments may be combined without contradicting each another.

The whole or part of the example embodiments described above may also be described as the following supplementary notes but are not limited thereto.

1. An image processing apparatus including:
   an image processing unit that determines, by processing an image in which a plurality of articles placed on a shelf are captured, each of the plurality of articles captured in the image; and
   an article inference unit that infers, when a specific condition is satisfied for an undetermined article which is the article an article name of which is indeterminable by the image processing unit, an article name of the undetermined article to be an article name of the article positioned adjacent to the undetermined article.

2. The image processing apparatus according to aforementioned 1, wherein
   the specific condition is a case that article names of the articles on both sides of the undetermined article are identical.

3. The image processing apparatus according to aforementioned 1, wherein
   the specific condition is a case that the undetermined article is positioned at an end of the shelf 4. The image processing apparatus according to aforementioned 1, wherein
   a first shelf and a second shelf immediately above the first shelf are captured in the image, and
   the specific condition is a case that a difference in position in a lateral direction between a first undetermined article placed on the first shelf and a second undetermined article placed on the second shelf is equal to or less than a reference value.

5. The image processing apparatus according to aforementioned 1, wherein
   the specific condition is a case that arrangement of article names of the plurality of articles has regularity and an article name of the undetermined article is identical to an article name of the adjacent article in the regularity.

6. An image processing method including, by a computer:
   by processing an image in which a plurality of articles placed on a shelf are captured, determining an article name of each of the plurality of articles captured in the image; and,
   when a specific condition is satisfied for an undetermined article which is the article an article name of which is indeterminable, inferring an article name of the undetermined article to be an article name of the article positioned adjacent to the undetermined article.

7. The image processing method according to aforementioned 6, wherein
   the specific condition is a case that article names of the articles on both sides of the undetermined article are identical.

8. The image processing method according to aforementioned 6, wherein
   the specific condition is a case that the undetermined article is positioned at an end of the shelf 9. The image processing method according to aforementioned 6, wherein
   a first shelf and a second shelf immediately above the first shelf are captured in the image, and
   the specific condition is a case that a difference in position in a lateral direction between a first undetermined article placed on the first shelf and a second undetermined article placed on the second shelf is equal to or less than a reference value.

10. The image processing method according to aforementioned 6, wherein
    the specific condition is a case that arrangement of article names of the plurality of articles has regularity and an article name of the undetermined article is identical to an article name of the adjacent article in the regularity.

11. A program causing a computer to perform:
a function of, by processing an image in which a plurality of articles placed on a shelf are captured, determining an article name of each of the plurality of articles captured in the image; and
a function of, when a specific condition is satisfied for an undetermined article which is the article an article name of which is indeterminable, inferring an article name of the undetermined article to be an article name of the article positioned adjacent to the undetermined article.

12. The program according to aforementioned 11, wherein the specific condition is a case that article names of the articles on both sides of the undetermined article are identical.

13. The program according to aforementioned 11, wherein the specific condition is a case that the undetermined article is positioned at an end of the shelf 14. The program according to aforementioned 11, wherein a first shelf and a second shelf immediately above the first shelf are captured in the image, and
the specific condition is a case that a difference in position in a lateral direction between a first undetermined article placed on the first shelf and a second undetermined article placed on the second shelf is equal to or less than a reference value.

15. The program according to aforementioned 11, wherein the specific condition is a case that arrangement of article names of the plurality of articles has regularity and an article name of the undetermined article is identical to an article name of the adjacent article in the regularity.

This application is based upon and claims the benefit of priority from Japanese Patent Application No. 2019-167973, filed on Sep. 17, 2019, the disclosure of which is incorporated herein in its entirety.

REFERENCE SIGNS LIST

10 Image processing apparatus
20 User terminal
30 Shelf
30a First shelf
30b Second shelf
32 Side
40 Article
40a Undetermined article
110 Acquisition unit
120 Image processing unit
130 Article inference unit
140 Reference data storage unit
142 Result storage unit
150 Output unit

The invention claimed is:
1. An image processing apparatus comprising:
at least one memory storing instructions; and
at least one processor configured to execute the instructions to:
determine, by processing an image in which a plurality of articles placed on a shelf are captured, each of the plurality of articles captured in the image;
based on a specific condition being satisfied for an undetermined article, the specific condition being that an article name of the undetermined article is indeterminable, infer the article name of the undetermined article as an article name of the article that is physically positioned adjacent to the undetermined article;
output, to a user terminal, the article name that has been inferred along with an image of the undetermined article; and
receive, from the user terminal, information indicating a correctness of the article name that has been inferred.

2. The image processing apparatus according to claim 1, wherein
the specific condition is a that article names of the articles on both sides of the undetermined article are identical.

3. The image processing apparatus according to claim 1, wherein
the specific condition is a that the undetermined article is positioned at an end of the shelf.

4. The image processing apparatus according to claim 1, wherein
a first shelf and a second shelf immediately above the first shelf are captured in the image, and
the specific condition is that a difference in position in a lateral direction between a first undetermined article placed on the first shelf and a second undetermined article placed on the second shelf is equal to or less than a reference value.

5. The image processing apparatus according to claim 1, wherein
the specific condition is that arrangement of article names of the plurality of articles has regularity and the article name of the undetermined article is identical to an article name of the article physically positioned adjacent to the undetermined article in the regularity.

6. The image processing apparatus according to claim 1, wherein the at least one processor is further configured to execute the instructions to:
store the article name that has been inferred after reception of the information indicating correctness of the article name that has been inferred.

7. A user terminal comprising:
a screen;
at least one memory storing instructions; and
at least one processor configured to execute the instructions to:
transmit to an image processing apparatus, an image in which a plurality of articles place on a shelf are captured;
receive from the image processing apparatus, based on a specific condition being satisfied for an undetermined article, the specific condition being that an article name of the undetermined article is indeterminable, inference result information indicating the article name of the undetermined article is inferred to be as an article name of the article that is physically positioned adjacent to the undetermined article;
display, on the screen, an image of the undetermined article, and the name of the undetermined article that has been inferred based on the inference result information;
receive input of correctness of the article name from a user; and
transmit, to the image processing apparatus, information indicating the correctness of the article name that has been inferred.

8. The user terminal according to claim 7, wherein the at least one processor is further configured to execute the instructions to:
   display on the screen the image of the undetermined article extracted from the image transmitted to the image processing apparatus.

9. The user terminal according to claim 7, wherein the at least one processor is further configured to execute the instructions to:
   display on the screen the image of the undetermined article including information for determining an area of the undetermined article.

10. The user terminal according to claim 7, wherein information for determining the area of the undetermined article is a frame line enclosing the undetermined article.

* * * * *